(12) United States Patent
Van Campfort et al.

(10) Patent No.: US 8,961,147 B2
(45) Date of Patent: Feb. 24, 2015

(54) METHOD FOR CONTROLLING A COMPRESSED AIR UNIT AND COMPRESSED AIR UNIT FOR APPLYING SUCH A METHOD

(75) Inventors: Kris Van Campfort, Aartselaar (BE); Olivier Marie-Andre B Beyaert, Hemiksem (BE); Peter Jozef Heirman, Meise (BE); Stijn Jozef Rita Johanna Janssens, Denderleeuw (BE)

(73) Assignee: Atlas Copco Airpower, Naamloze Vennootschap, Wilrijk (BE)

(*) Notice: Subject to any disclaimer, the term of this patent is extended or adjusted under 35 U.S.C. 154(b) by 367 days.

(21) Appl. No.: 13/000,235

(22) PCT Filed: Jun. 11, 2009

(86) PCT No.: PCT/BE2009/000031
§ 371 (c)(1),
(2), (4) Date: Dec. 20, 2010

(87) PCT Pub. No.: WO2010/000045
PCT Pub. Date: Jan. 7, 2010

(65) Prior Publication Data
US 2011/0110795 A1   May 12, 2011

(30) Foreign Application Priority Data

Jul. 2, 2008 (BE) .................................. 2008/0366

(51) Int. Cl.
*F04B 49/06* (2006.01)
*F16T 1/00* (2006.01)

(52) U.S. Cl.
CPC ....................................... *F16T 1/00* (2013.01)
USPC ............................................ 417/53; 417/243

(58) Field of Classification Search
USPC .............. 417/53, 243; 137/118.07, 256, 112, 137/606, 607, 624.18, 180, 184, 565.18, 137/565.36; 210/739–746, 109–119, 210/141–149; 415/36–51
See application file for complete search history.

(56) References Cited

U.S. PATENT DOCUMENTS

| | | | |
|---|---|---|---|
| 3,216,648 A * | 11/1965 | Ford | 417/53 |
| 3,239,432 A * | 3/1966 | Rhodes et al. | 202/160 |
| 4,197,990 A | 4/1980 | Carberg et al. | |
| 4,922,233 A | 5/1990 | Twerdochlib | |
| 4,974,626 A | 12/1990 | Koch | |
| 5,079,922 A * | 1/1992 | Viscovich et al. | 60/678 |
| 5,144,974 A | 9/1992 | Gaudin | |
| 5,512,249 A | 4/1996 | Singh | |
| 6,196,253 B1 | 3/2001 | Love | |

(Continued)

FOREIGN PATENT DOCUMENTS

| | | |
|---|---|---|
| BE | 1005764 A3 | 1/1994 |
| EP | 0 391 250 A2 | 10/1990 |

OTHER PUBLICATIONS

International Search Report in PCT/BE2009/000031, Oct. 19, 2009.

*Primary Examiner* — Peter J Bertheaud
*Assistant Examiner* — Dnyanesh Kasture
(74) *Attorney, Agent, or Firm* — Bacon & Thomas, PLLC

(57) ABSTRACT

Method for controlling a compressed air unit which is provided with at least one controllable drain valve (8, 27, 37 or 39), where the above-mentioned drain valve (8, 27, 37 or 39) are controlled at least on the basis of a system parameter which is not a system parameter on the feed side of the drain valve (8, 27, 37 or 39).

12 Claims, 1 Drawing Sheet

(56) References Cited

U.S. PATENT DOCUMENTS

| | | | |
|---|---|---|---|
| 6,588,443 B2 * | 7/2003 | Schlensker et al. | 137/2 |
| 8,308,439 B2 * | 11/2012 | Lomax et al. | 417/19 |
| 2002/0121302 A1 | 9/2002 | Thompson, Jr. | |
| 2002/0197170 A1 * | 12/2002 | Bowen et al. | 417/395 |
| 2006/0222515 A1 * | 10/2006 | Delmotte et al. | 417/228 |

\* cited by examiner

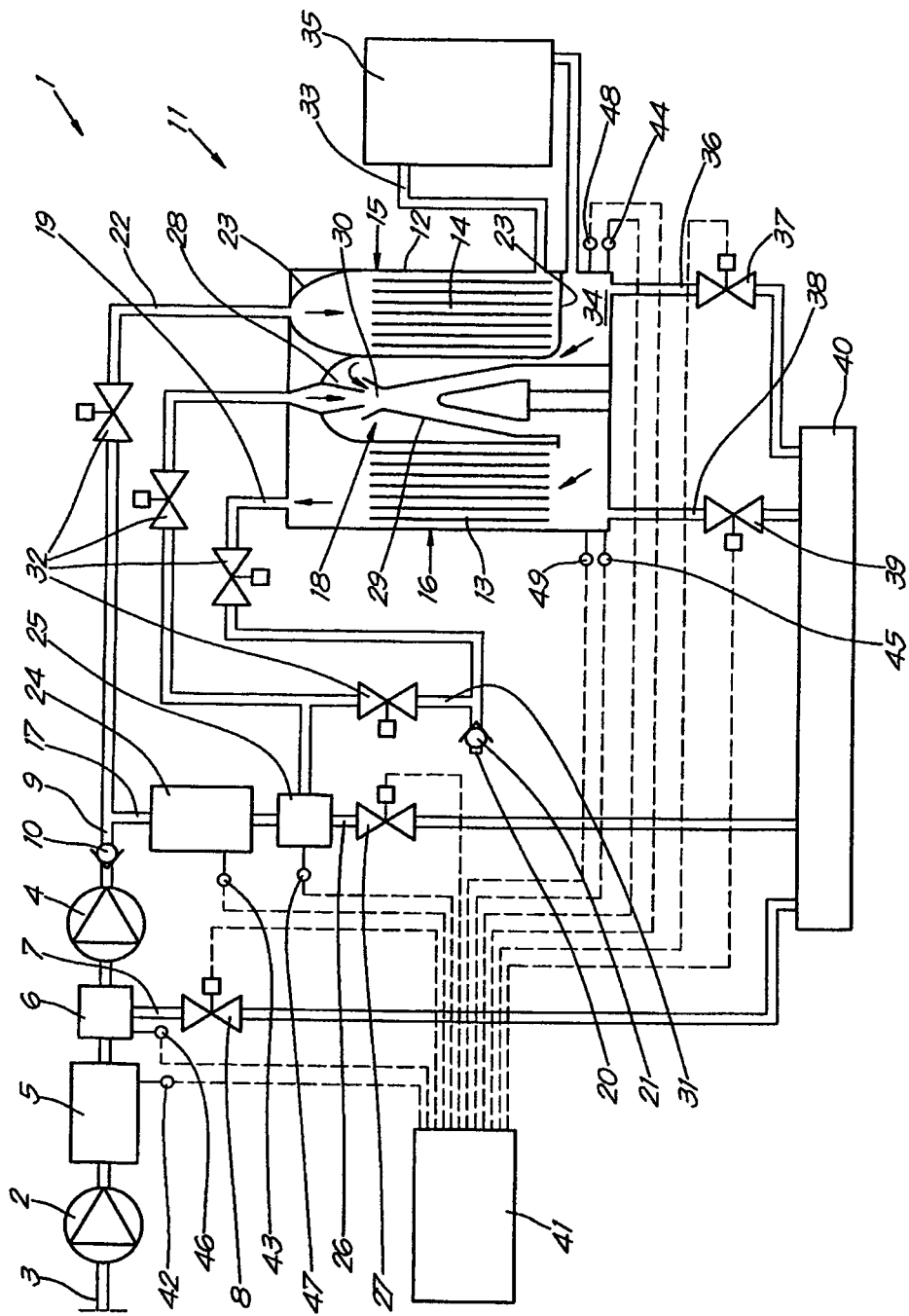

METHOD FOR CONTROLLING A COMPRESSED AIR UNIT AND COMPRESSED AIR UNIT FOR APPLYING SUCH A METHOD

FIELD OF INVENTION

The present invention concerns a method for controlling a compressed air unit such as a compressor unit, a dryer unit or the like as well as a compressed air unit to apply such a method.

BACKGROUND

From U.S. Pat. No. 6,588,443 B2 is already known a method for controlling a compressed air unit, and in particular for discharging condensate from a multi-stage compressor unit, whereby the condensate which is formed in a cooler of each respective pressure stage is discharged via a drain pipe provided downstream said pressure stage to that end.

A disadvantage of such a method according to U.S. Pat. No. 6,588,443 B2 is that many valves are required and that a device for applying such a method is voluminous, as several valves and connections are present. Another disadvantage of such a method is that it cannot be used to perform other functions than to discharge condensate.

From EP 0,391,250 A2 is known a device which can be used to discharge a condensate until a set level is reached, as soon as another pre-set maximum level of condensate has been reached in a collector.

A disadvantage of this configuration is that no other measuring signals are taken into account and that such a configuration is only suitable for discharging the condensate coming from only one collector to an open reservoir, and in that it cannot be used to perform other functions.

U.S. Pat. No. 6,196,253 B1 describes a drain valve to immediately discharge condensate when it is present at the inlet of said drain valve. The disadvantage of such a valve gear, however, is that it can only be used to discharge condensate from a single reservoir to an open reservoir. Another disadvantage is the lack of a large volume, which implies that many work cycles are required to discharge large volumes of condensate.

SUMMARY

The present invention aims to provide a method for controlling a compressed air unit, which method has been improved in many different aspects compared to the known methods.

To this end, the present invention concerns a method for controlling a compressed air unit which is provided with at least two controllable drain valves said method comprising the step of controlling at least one of said drain valve, at least on the basis of a system parameter which is not a system parameter on the feed side of said drain valve, whereby said method comprises one of the following steps:

determining the pressure on the feed side of the respective drain valves and controlling different drain valves, such that two drain valves having different pressures on the feed side cannot be simultaneously open; or controlling two drain valves which are part of the compressed air unit in such a way that they can never be simultaneously open.

With the feed side of the drain valve is meant the inlet side of the valve here or, in other words, the side which is upstream in relation to said drain valve.

In this case, by a drain valve is meant a valve which can be used to drain condensate, but it is not excluded to use such a valve for other functions as well.

An advantage of a method according to the invention is that it allows to realize a simple and compact configuration; since only a limited number of valves are required.

The above-mentioned system parameter hereby consists of a measurable, physical parameter appearing in the compressed air unit, such as a temperature value, a pressure value, a liquid level or the like, or an internal status signal which is generated on the basis of a measurable physical parameter.

By such an internal status signal is meant a signal which is calculated in a controller or determined by means of the measurement of a physical parameter. An example of such an application consists in realising a control by means of a timer which starts on the basis of the registration of a certain measurable, physical parameter.

An advantage of the method according to the invention is that it allows to perform certain functions which have been realised up to now by means of separate components, such as blow-off valves or the like, by means of drain valves, such that certain components are no longer required.

Thus, for example, upon detecting that the pressure in an intercooler exceeds a certain limit value and this is detected, the pressure of this intercooler will be blown off via a controllable drain valve provided on this intercooler.

According to the invention, the method also comprises the steps of determining the pressure on the feed side of at least two drain valves which are part of the compressed air unit and of controlling the different drain valves in such a way that two drain valves having different pressure values on the feed side will not be open simultaneously.

An advantage of this specific method is that it avoids two drain valves to be open simultaneously, as a result of which condensate is prevented from flowing from one part of the compressed air unit to another part thereof having lower pressure.

According to the invention, the method comprises the step of controlling two different drain valves which are part of the compressed air unit in such a way that simultaneously.

This can be realised for example by measuring the liquid level on the feed side of said respective drain valves and by determining on the basis thereof whether a drain valve is either or not open.

BRIEF DESCRIPTION OF THE DRAWING

In order to better explain the characteristics of the present invention, the following preferred method according to the invention for controlling a compressed air unit is described by way of example only without being limitative in any way, as well as a compressed air unit to apply such a method, with reference to the only accompanying FIGURE.

DETAILED DESCRIPTION OF VARIOUS EMBODIMENTS OF THE DISCLOSURE

This FIGURE represents a compressed air unit 1 which is in this case provided with a two-stage compressor having a low pressure stage 2 which is connected to a suction line 3 and which is connected to a high pressure stage 4 with its outlet side.

Between the pressure stages 2 and 4 is provided an intercooler 5, as well as a first liquid separator 6 onto which is connected a first drain pipe 7 in which is provided a first drain valve 8.

In the compressed air line 9 of the high pressure stage 4 is provided a non-return valve 10 which allows for a flow of the high pressure stage 4 in the compressed air line 9 and which prevents compressed gas, when the two-stage compressor is switched off, from flowing from the components, which are still under pressure and which are situated downstream said two-stage compressor, back to the suction line 3.

In the present example, the compressed air unit 1 also comprises a drying device to dry the gas coming from the two-stage compressor, which drying device mainly consists of a dryer 11 of the type which is described in BE 1,005,764 and which is formed of a pressure vessel 12 with a drying zone 13 and a regeneration zone 14, with a rotor 15 which is built of a cylindrical drying element 16 in which is provided an adsorption and/or absorption medium which is alternately guided through the drying zone 13 and the regeneration zone 14.

Further, the dryer 11 comprises a main duct 17 which is, connected to the compressed air line 9 and which connects the dryer 11 to the outlet of the high pressure stage 4 and which opens in a mixing device 18 whose outlet is connected to the inlet of the above-mentioned drying zone 13.

An outlet line 19 connects the outlet of the drying zone 13 to a consumer network 20, whereby the outlet line 19 and the consumer network 20 are separated by a non-return valve 21.

A side duct couples the compressed air line 9 to the inlet of the regeneration zone 14.

This regeneration zone 14 consists of a sector of the rotor 15 which is closed off on both axial sides by means of screens 23. The remainder of the rotor 6 forms the drying zone.

The above-mentioned main duct 17 is in this case provided with an aftercooler 24 and a second liquid separator 25 provided downstream said aftercooler 24 which is equipped with a second drain pipe 26 in which is provided a second drain valve 27.

The mixing device 18 consists of an ejector which, as is known, comprises a jet pipe 28 and a mixing pipe 29, in between which is provided a suction opening 30. The mixing pipe 29 gives out at the inlet of the drying zone 13.

The mixing device 18 is used in this case, in the known manner, as the driving shaft for the rotor 15, to which end the mixing pipe 29 is connected to a motor, not represented in the FIGURE, by means of a shaft which is connected to the mixing pipe 29 by means of a coupling.

The above-mentioned outlet line 19 of the dryer 11 can be connected to the main duct 17, as is customary, by means of a bypass 31 which, in this case, just as the main duct 17, the outlet line 19 and the side duct 22, comprises a shut-off valve 32.

The outlet of the regeneration zone 14 is connected to an inner space 34 in the pressure vessel 12 via a cooling pipe 33, which inner space 34 is connected to the above-mentioned suction opening 30.

In this cooling pipe 33 is provided a regeneration cooler 35 which is for example but not necessarily air-cooled but which, in principle, may have the shape of any type of heat exchanger whatsoever.

Onto the pressure vessel 12 a third drain pipe 36 is connected, in which a third drain valve 37 is provided in this case.

Also onto the inlet of the drying zone 13 is in this case connected a fourth drain pipe 38 wherein also a fourth drain valve 39 is provided.

Each of the above-mentioned drain pipes 7, 26, 36 and 38 is in this example but not necessarily connected to a single common reservoir 40. However, it is also possible according to the invention to provide several reservoirs and/or to use an open reservoir.

The compressed air unit 1 further comprises a controller 41 with which the drain valves 8, 27, 37 and 39 are connected in a controllable manner and onto which are also connected detection means to at least determine a system parameter which is not a system parameter on the feed side of a controllable drain valve concerned, and, in this case, several system parameters, namely the measured values of the system pressure and of the liquid levels on the feed sides of the respective drain valves 8, 27, 37 and 39.

To this end, the above-mentioned detection means comprise four pressure sensors 42 to 45 which are each provided on the feed side of an aforesaid drain valve 8, 27, 37 and 39.

In this example, the first pressure sensor 42 is provided in the intercooler 5, the second pressure sensor 43 is provided in the aftercooler 24, the third pressure sensor 44 measures the pressure in the space 34, and the fourth pressure sensor 45 is mounted such that it measures the pressure at the inlet of the drying zone 13.

Further, the detection means in this case comprise two level sensors 46 and 47, provided in the respective liquid separators 6, 25, and two level sensors 48 and 49 which are provided in the dryer 11, on the feed side of the drain valves 37, 39 respectively, whereby each of these level sensors 46 to 49 are also connected to the above-mentioned controller 41.

The invention is not limited to the use of the pressure and level sensors represented in the figures; on the contrary, also other configurations are possible. Thus, it is possible to omit one or several level sensors, for example.

The working of a compressed air unit 1 according to an application of the invention is very simple and as follows.

When the two-stage compressor is started, a gas, for example air, is sucked in via the suction line 3, which gas is first compressed through the low pressure stage 2 and is subsequently pressed through the intercooler 5 and the first liquid separator 6 to the high pressure stage 4 to be further compressed there.

Thanks to the combination of the pressure increase and the subsequent temperature drop of the compressed gas in the intercooler 5, the water vapour which is present in the gas flow may condense, as is known, as a result of which liquid drops are formed in the gas flow which are separated from the gas flow in the first liquid separator 6.

In the compressed gas, which is 100% saturated just downstream the first liquid separator 6, condense drops will form again after its compression by the high pressure stage 4 and its passage through the aftercooler 24, which will be removed from the gas flow in the second liquid separator 25.

The compressed, saturated gas leaving the second liquid separator 25 then flows in the dryer 11, where the gas to be dried is guided through the mixing device 18 and is subsequently dried by means of adsorption and/or absorption medium which takes up moisture from the gas.

The dried gas is subsequently guided through the outlet line 19 to the consumer network 20.

In order to be able to regenerate the adsorption and/or absorption medium, the rotor 15 is driven at low speed by the motor, as is known, whereby the adsorption and/or absorption medium is alternately guided through the drying zone 13 and the regeneration zone 14.

The side duct 22 guides a part of the gas to be dried from the compressed air line 9 to the regeneration zone 14, which part of the gas does not flow through the main duct 17 and consequently is not cooled in the aftercooler 24.

Consequently, the gas to be dried is still relatively hot and unsaturated, such that it can take up moisture from the adsorption and/or absorption medium as it flows through the regeneration zone 14.

At the outlet of the regeneration zone 14, the gas is guided to the regeneration cooler 35 via the cooling pipe 33, to be subsequently sucked in, via the space 34 and through the suction opening 30, in the mixing pipe 29, where this gas is mixed with gas to be dried from the main duct 17.

The method according to the invention for controlling a compressed air unit comprises the step of controlling at least one of the drain valves 8, 27, 37 or 39, at least on the basis of a system parameter which is not a system parameter on the feed side of the drain valve 8, 27, 37 or 39 concerned, so as to discharge condensate via said drain valves 8, 27, 37 or 39 to the reservoir 40.

To this end, the controller 41 is provided with an algorithm to control at least one, and in this case all the drain valves 8, 27, 37 and 39 in this way.

The above-mentioned system parameter in this case comprises measured values of the system pressure on the feed side of the respective drain valves 8, 27, 37 and 39, which measured values are determined by the respective pressure sensors 42 to 45; however, in the present example, the liquid level on the feed side of the drain valves 6 and 25 is also taken into account.

The different drain valves 8, 27, 37 and 39 are controlled such by the controller 41 that two drain valves 8, 27, 37 and 39 having different pressure values on the feed side cannot be open simultaneously.

However, it is also possible to control the different drain valves 8, 27, 37 and 39 such that they are never open simultaneously, which can be realized for example by measuring the liquid level on the feed side of these respective drain valves 8, 27, 37 and 39 and to determine on the basis thereof whether a drain valve 8, 27, 37 or 39 is either or not open.

The method in this case also comprises the step of determining the liquid level on the feed side of a drain valve 8, 27, 37 and 39, and to open the drain valve 8, 27, 37 or 39 concerned as soon as the measured liquid level exceeds a preset limit value.

This can be realised by means of the above-mentioned controller 41, which is connected to level sensors 46 to 49 to this end, and which can always take the respective measured pressure values on the feed side of the drain valves 8, 27, 37 and 39 into account when applying this method.

According to a special characteristic of the invention, by controlling the different drain valves 8, 27, 37 and 39 by means of a central controller 41, these drain valves 8, 27, and 39 can also be used for other functions than to discharge condensate, such as for example to blow off gas.

In the given example of the compressed air unit 1, this can be applied for example to regenerate the dryer during a standstill, whereby gas which is sent through the drying device 16 can be blown off via the drain valves 37 and/or 39.

For example, the drain valve 8 which is provided immediately after, i.e. downstream the intercooler 5, can also be used to blow off the intercooler pressure in order to empty the intercooler volume.

The method according to the invention preferably also comprises the step of generating an alarm when an improper measured value is registered by the above-mentioned controller 41, as the above-mentioned parameter does not change in the way intended by the controller 41, whereby at least the above-mentioned system parameter which is different from the liquid level on the feed side of a drain valve is taken into account, and, possibly, the liquid level on the feed side of a drain valve.

An example thereof is that, if one of the drain valves 8 or 27 is opened by the controller 41 as a too high liquid level is detected by the concerning level sensor, and the level sensor 46 or 47 on the feed side of another drain valve 8 or 27 does not detect liquid anymore, one can easily deduce that the wiring of either a drain valve 8 or 27, or a level sensor 46 or 47 was not executed correctly.

An advantage of a compressed air unit 1 according to the invention is that it makes it possible to determine the volume of condensate that has been discharged via the drain valves 8, 27, 37 and 39.

The amount of condensate to be expected in a compressor can be calculated on the basis of the humidity of the sucked-in air, the mass flow, pressure values and temperatures.

These data can be measured or calculated on the basis of measurements and are thus available together with the actually discharged amount of condensate. If this amount of discharged condensate is smaller than the calculated amount of condensate, this may indicate for example that a water separator is not working properly.

If the volume of separated condensate is larger than the calculated value, this may indicate for example that there is a liquid leak from a liquid circuit to the gas side.

Another advantage of a method according to the invention for discharging condensate consists in that no check valve must be provided in a compressor or a unit where the pressure in the condensate reservoir could drop below atmospheric pressure. This can be detected by means of the controller 41 which takes this into account to control the drain valve concerned, such that the check valve is no longer necessary on the drainage outlet.

In the example described above, the major system parameters which are used to control the drain valves 8, 27, 37 and 39 consist of system pressures and liquid levels, but it is not excluded according to the invention for other system parameters to be used to this end as well, such as for example temperature values, or to use a combination of different parameters.

Naturally, it is not excluded for the system parameter or system parameters on the basis of which the drain valves are controlled to be measured, calculated or determined in any other way whatsoever.

Also the use of a combination of measured and calculated values for one or several system parameters is an option.

The present invention is by no means restricted to the method and device described by way of example and illustrated by means of the accompanying drawings; on the contrary, such a method according to the invention and a device for applying such a method can be realised in many different ways while still remaining within the scope of the invention.

The invention claimed is:

1. A method for controlling a compressed air unit having at least two controllable drain valves each having a feed side, comprising the steps:

controlling at least a first controllable drain valve of said at least two controllable drain valves at least on a basis of a system parameter on a feed side of a second controllable drain valve of said at least two controllable drain valves which is not a system parameter on the feed side of said at least first controllable drain valve, determining whether the second controllable drain valve is open, and preventing said at least first controllable drain valve from being opened simultaneously with the second controllable drain valve when the second controllable drain valve is open; or controlling at least a first controllable drain valve of said at least two controllable drain valves at least on a basis of a system parameter on the feed side of the second controllable drain valve which is not a system parameter on the feed side of said at least first controllable drain valve and further determining a pressure on the feed side of both of the at least two controllable drain valves and preventing the first controllable drain valve from being simultaneously open with the second controllable drain valve when the first and second controllable drain valves have different pressures on a respective feed side of the at least two controllable drain valves.

2. The method according to claim 1, wherein the system parameter of the compressed air unit comprises a measured value of a system temperature or pressure.

3. The method according to claim 1, wherein the system parameter of the compressed air unit comprises an internal status signal which is generated on the basis of a measurable physical parameter.

4. The method according to claim 1, further comprising measuring a liquid level on the feed side of the at least one drain valve of the at least two controllable drain valves.

5. The method according to claim 1, including the step of measuring a liquid level on the feed side of the at least two controllable drain valves and determining on the basis thereof whether one of said at least two controllable drain valves is open or not.

6. The method according to claim 1, including the step of using at least one of the at least two controllable drain valves to blow off gas and/or to lower the pressure.

7. The method according to claim 1, including using a controller to control the at least two controllable drain valves.

8. The method according to claim 7, including generating an alarm when an incorrect measured value is registered by the controller if the system parameter of the compressed air unit does not change in an intended way by the controller to enable the system parameter of the compressed air unit to be taken into account.

9. The method according to claim 1, including determining an amount of condensate from the compressed air unit that has been discharged via the at least two controllable drain valves.

10. A method for controlling a compressed air unit having at least two controllable drain valves each having a feed side, comprising the steps:
controlling at least a first controllable drain valve of said at least two controllable drain valves at least on a basis of a system parameter on a feed side of a second controllable drain valve of said at least two controllable drain valves which is not a system parameter on the feed side of said at least first controllable drain valve, determining whether the second controllable drain valve is open, and preventing said at least first controllable drain valve from being opened simultaneously with the second controllable drain valve when the second controllable drain valve is open.

11. A method for controlling a compressed air unit having at least two controllable drain valves each having a feed side, comprising the steps:
controlling at least a first controllable drain valve of said at least two controllable drain valves at least on a basis of a system parameter of the compressed air unit which is not a system parameter on the feed side of said at least first controllable drain valve and further determining a pressure on the feed side of both of the at least two controllable drain valves and controlling the first and second controllable drain valves such that when the first and second controllable drain valves have different pressures on a respective feed side of the at least two controllable drain valves, the first and second controllable drain valves cannot be simultaneously opened, and
controlling said at least two controllable drain valves such that when the first and second drain valves have equal pressures in the respective feed side of the drain valves, the first and second drain valves are allowed to be simultaneously opened.

12. A method for controlling a compressed air unit having at least two controllable drain valves each having a feed side, comprising the steps:
controlling at least a first controllable drain valve of said at least two controllable drain valves at least on a basis of a system parameter on the feed side of a second controllable drain valve of the at least two controllable drain valves which is not a system parameter on the feed side of said at least first controllable drain valve and further determining a pressure on the feed side of both of the at least two controllable drain valves and preventing the first controllable drain valve from being simultaneously open with the second controllable drain valve when the first and second controllable drain valves have different pressures on a respective feed side of the at least two controllable drain valves.

* * * * *